United States Patent
Corona et al.

(10) Patent No.: US 10,838,051 B2
(45) Date of Patent: Nov. 17, 2020

(54) METHOD OF DETECTING OBJECTS AND CORRESPONDING APPARATUS

(71) Applicant: STMICROELECTRONICS S.R.L., Agrate Brianza (IT)

(72) Inventors: Stefano Corona, Borgarello (IT); Matteo Albertini, Pavia (IT); Francesco D'Angelo, Giussago (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 238 days.

(21) Appl. No.: 15/610,101

(22) Filed: May 31, 2017

(65) Prior Publication Data
US 2018/0172810 A1 Jun. 21, 2018

(30) Foreign Application Priority Data
Dec. 16, 2016 (IT) .................. 102016000127506

(51) Int. Cl.
G01S 7/52 (2006.01)
G01S 15/10 (2006.01)
G01S 7/524 (2006.01)
G01S 7/523 (2006.01)
G01S 7/527 (2006.01)
G01S 15/93 (2020.01)

(52) U.S. Cl.
CPC ............ *G01S 7/524* (2013.01); *G01S 7/523* (2013.01); *G01S 7/527* (2013.01); *G01S 15/102* (2013.01); *G01S 15/108* (2013.01); *G01S 15/93* (2013.01)

(58) Field of Classification Search
CPC .......... G01S 7/524; G01S 7/527; G01S 15/93; G01S 15/108; G01S 7/523; G01S 15/102
See application file for complete search history.

(56) References Cited

U.S. PATENT DOCUMENTS

| | | | |
|---|---|---|---|
| 5,131,271 A * | 7/1992 | Haynes ............... | G01F 23/2962 181/124 |
| 2006/0037392 A1 | 2/2006 | Carkner et al. | |
| 2012/0118059 A1* | 5/2012 | Reimer ................. | F01N 3/2066 73/290 V |
| 2015/0003205 A1 | 1/2015 | Urase | |
| 2018/0045554 A1* | 2/2018 | Reimer ................. | G01F 23/296 |

FOREIGN PATENT DOCUMENTS

| | | | | |
|---|---|---|---|---|
| DE | 102010018349 A1 | 11/2011 | | |
| EP | 2811317 A1 * | 12/2014 | ............. | G01S 7/527 |

\* cited by examiner

*Primary Examiner* — Ian J Lobo
(74) *Attorney, Agent, or Firm* — Seed IP Law Group LLP

(57) ABSTRACT

A method of detecting objects includes transmitting toward an object a first acoustic signal including a first set of pulses including a first number of pulses, and checking if a first echo signal resulting from reflection of the first acoustic signal is received with an intensity reaching an echo detection threshold. If the intensity of the first echo signal reaches the echo detection threshold, the distance to the object is calculated as a function of the time delay of the first echo signal. If the intensity of the first echo signal fails to reach the echo detection threshold, one or more further acoustic signals are transmitted including a set of pulses wherein the number of pulses is increased with respect to the number of pulses in said first acoustic signal.

18 Claims, 3 Drawing Sheets

METHOD OF DETECTING OBJECTS AND CORRESPONDING APPARATUS

BACKGROUND

Technical Field

The description relates to electro-acoustic systems.

One or more embodiments may be applied to, e.g., ultrasonic wave detection and ranging, for instance in applications for the consumer market and/or in robotics.

Description of the Related Art

Ultrasonic wave detectors may be commonly used for measuring distance, detecting obstacles and in sensors/systems for detecting in real time a surrounding environment.

Ultrasonic wave detectors may include a transmitter, which "shoots" an acoustic (e.g., ultrasonic) wave in a certain direction and a receiver which may detect an echo of the transmitted acoustic wave produced by reflection of the acoustic wave at, e.g., an obstacle ("target").

A measuring system, e.g., a micro controller, calculates the time of flight (TOF), i.e., the time between transmission and reception of a corresponding (valid) echo signal. Once the time of flight is known, the distance (D) to the obstacle can be calculated, as a function of the speed (v) of the acoustic wave (e.g., in air, at 20° C., about 343 m/s), as $D=v*TOF/2$.

The acoustic (e.g., ultrasonic) wave may be generated by means of a (e.g., piezo) transducer driven with, e.g., a square waveform with frequency equal to the transducer natural resonance frequency. The receiving end of the system may include the same transmitting transducer (e.g., a piezo transducer) or a second transducer (e.g., a piezo transducer).

The total energy that is transmitted may depend on the number of pulses in the driving waveform. During propagation part of the energy is attenuated and, if not high enough to be reflected and/or sensed by the receiving transducer after reflection, the measure will fail.

Various solutions to this problem known in the art exploit a fixed number of pulses (cycles). This may result in low accuracy and a waste of energy, thus making the system inefficient.

Low accuracy may be due to saturation of the (analog) front-end receiver, e.g., in near field measurement. Also, high energy transmission may cause spurious echoes from non-target objects and this effect may again result in low accuracy.

While a signal with a fixed number of pulses may not be strong enough to be reflected and received (so that loss of information may result), the unnecessary use of a higher number of driving pulses with respect to those actually needed for an echo signal to be received may result in energy being wasted.

BRIEF SUMMARY

Despite the extensive activity in that area, a demand is still felt for improved solutions, with, e.g., higher accuracy and/or lower energy loss.

An object of one or more embodiments is to contribute in meeting such a demand.

According to one or more embodiments, a method includes:

transmitting toward an object a first acoustic signal including a first set of pulses including a first number of pulses, checking if a first echo signal resulting from reflection of said first acoustic signal by the object is received with an intensity reaching an echo detection threshold, if the intensity of said first echo signal reaches said echo detection threshold, calculating a distance to the object as a function of a time delay of said first echo signal, and if the intensity of said first echo signal fails to reach said echo detection threshold, transmitting a second acoustic signal including a set of pulses having a number of pulses that is increased with respect to the number of pulses in said first acoustic signal.

One or more embodiments may also relate to a corresponding apparatus (e.g., obstacle detector).

The claims are an integral part of the technical disclosure of embodiments as provided herein.

One or more embodiments may adopt, instead of a fixed number of pulses, a variable number of pulses, e.g., based on a "try and adjust" approach thus facilitating finding a signal energy level adapted to a certain operating situation in question.

In one or more embodiments, a measurement system (e.g., a microcontroller) may start driving a transmitter (e.g., a piezo transducer) with a fixed starting number of pulses (e.g., a square wave with 3 cycles) which may be possibly increased.

In one or more embodiments, such a starting value (e.g., 3, this value being otherwise not mandatory) may correspond to a lower expected bound of the transmitted energy to produce a detectable echo.

In one or more embodiments, such a starting value may be user programmable.

In one or more embodiments, if an echo signal is received and this echo signal is held to be a "valid" one, e.g., reaching a certain threshold value, the distance to the target (e.g., an obstacle) may be calculated.

In one or more embodiments, if a corresponding echo signal fails to reach the receiver (or an echo signal is received which is too weak to reach a threshold for validity), a new signal is sent including a number of pulses which is higher than the previous one. The transmitted energy is thus increased.

In one or more embodiments, (re)transmission with an increased number of pulses (e.g., with step-wise increments) may take place until a valid echo signal is received.

In one or more embodiments, retransmission with increased numbers of pulses may be discontinued as a result of an upper limit for the number of pulses (or energy) being reached.

In one or more embodiments, said upper limit can be user programmable.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
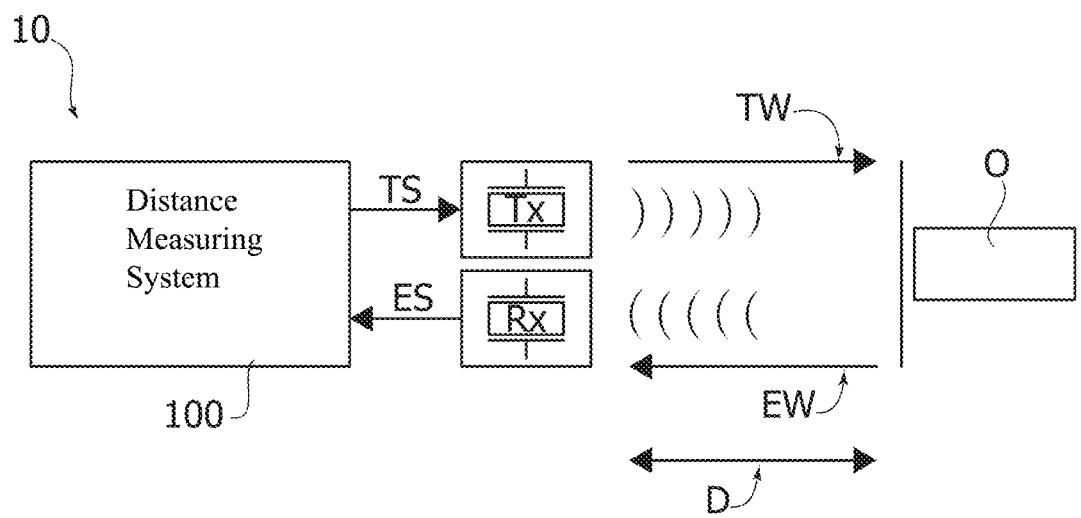
FIG. 1 is a block diagram exemplary of a possible context of use of one or more embodiments.

In FIG. 1, reference number 10 describes an apparatus including a distance measuring system 100, a transmitter TX and a receiver RX.

Such apparatus may be used, e.g., for detecting the presence and measuring the distance D from apparatus 10 to a "target" object, e.g., an obstacle O.

In one or more embodiments the transmitter TX and the receiver RX may include transmission/reception transducer (s) e.g., of the piezoelectric type.

In one or more embodiments, the transmitter TX and the receiver RX may include distinct transmission and reception transducers.

In one or more embodiments, the transmitter TX and the receiver RX may share a common transmission/reception transducer.

In operation of an arrangement as exemplified in FIG. 1, the (electro-acoustical) transducer in the transmitter TX may be driven by a transmission signal TS (e.g., as produced by the system 100) to generate a transmitted acoustic (e.g., ultrasonic) wave TW.

The acoustic wave may impinge on the object O and be reflected as an "echo" wave EW travelling back to the receiver RX. The (acoustic-electrical) transducer of the receiver RX translates the acoustic wave EW into an electrical echo signal ES to be fed to the system 100.

As discussed previously, the total time of flight, TOF, that is the time taken by the acoustic wave to leave the transducer TX and be detected by the transducer RX may permit to calculate the distance D.

Save for what is discussed in detail in the following, the structure and operation of apparatus 10 as exemplified in FIG. 1 are known in the art, thus making it unnecessary to provide a more detailed description herein.

In one or more embodiments, operation of the system 100 may involve comparison of received signals against a certain threshold T (see, e.g., FIG. 4, to be discussed in the following). In one or more embodiments, processing to generate a measurement of the distance D may in fact be performed (only) if an echo signal ES of sufficient strength is received. This kind of operation may permit, e.g., to reject spurious signals of various types (e.g., noise) and/or to avoid processing being activated unnecessarily when no echo signal proper is received and/or when an echo signal received is too weak to permit accurate/reliable distance calculation.

In one or more embodiments, the system 100 may be configured to perform different tasks, including, e.g.:

selecting a (e.g., user selectable) number of pulses (e.g., cycles of a square wave) in a signal TS to be transmitted by the transmitter TX, by driving the (e.g., piezoelectric) transducer in the transmitter TX to generate a respective acoustic wave TW, detecting (e.g., waiting a fixed time) echo signals ES as obtainable by the (e.g., piezoelectric) transducer in the receiver RX by converting a received echo wave EW.

In one or more embodiments, the system 100 may be configured to operate in such a way that:

i) if a valid echo signal ES (e.g., reaching the threshold T) is detected, the distance D from the object O is calculated, or ii) if no valid echo signal ES is detected (e.g., no signal at all is detected or a detected signal fails to reach the threshold T) a "new" signal TS is transmitted wherein the number of pulses is increased (e.g., by a unitary step) with respect to the previous transmission.

In one or more embodiments, operation as discussed above may be repeated by step-wise increasing (e.g., by unitary steps) the number of pulses at each re-transmission until a valid echo signal is received.

In one or more embodiments, an upper limit for the number of re-transmissions may be set (e.g., at a user selectable value) and re-transmission with a gradually increased number of pulses discontinued as a result of that upper limit being reached.

Figure 2:
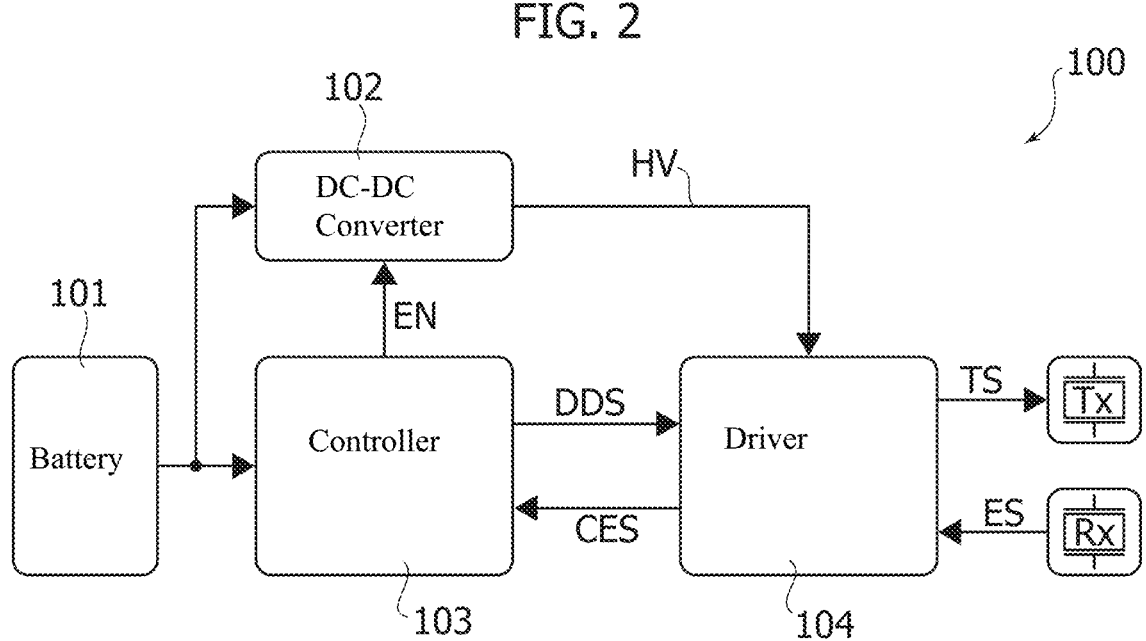
FIG. 2 is a block diagram exemplary of one or more embodiments.

In FIG. 2, an exemplary block diagram of a system 100 shown together with a transmitter TX and a receiver RX.

For instance—and merely by way of example—in one or more embodiments, the system 100 may be supplied by a battery 101 (e.g., a lithium polymer (LiPo) battery with a capacity of 250 mAh with two cells=8.4V), which supplies a DC-DC converter 102 and a (micro) controller 103 (e.g., as STM32F334 available with the companies of the STMicroelectronics group).

The DC-DC converter 102 may be enabled (e.g., via a signal EN) by the microcontroller 103 and may be used to "magnify" the battery voltage to drive the, e.g., piezoelectric transducer(s) of the transmitter TX and the receiver RX.

In one or more embodiments, the microcontroller 103 may be coupled (e.g., via a serial interface) to a transducer driver 104 (e.g., an ultrasonic piezo driver).

Such coupling may include:

the microcontroller 103 sending to the driver 104 a digital driving signal DDS to produce transmission of a transmission wave TW from the transmitter TX, the microcontroller 103 receiving from the driver 104 an (e.g., conditioned) echo signal CES which may correspond to an echo wave EW received at the receiver RX.

In one or more embodiments, the signal DDS may include information on the number of cycles (pulses), the piezo driving frequency and a start command. In one or more embodiments, the start command may enable also a TOF timer and a timeout timer.

In one or more embodiments, the transducer driver 104 may receive a magnified voltage HV from the DC-DC converter 102 and use it to drive the transmitter transducer with a transmission signal TS.

In one or more embodiments, the transducer driver 104 may also be configured to receive an echo signal ES from the receiver transducer and create (e.g., with an embedded analogue front-end) a conditioned echo signal CES to be fed to the microcontroller 103.

In one or more embodiments the microcontroller 103 may have an embedded analogue comparator used to detect the conditioned echo signal CES.

In one or more embodiments, the microcontroller 103 may thus be configured to perform—as discussed previously—comparison of the signal CES against a threshold T.

In one or more embodiments, such comparison may reveal that a "valid" echo signal is available for calculating the distance D to the object.

In one or more embodiments, such comparison may likewise reveal those situations where—e.g., within a certain timeout from transmission—no "valid" echo signal has reached the transducer driver 104, so that re-transmission with an increased number of pulses may take place as exemplified previously. In one or more embodiments, the timeout may be user programmable.

Figure 3:
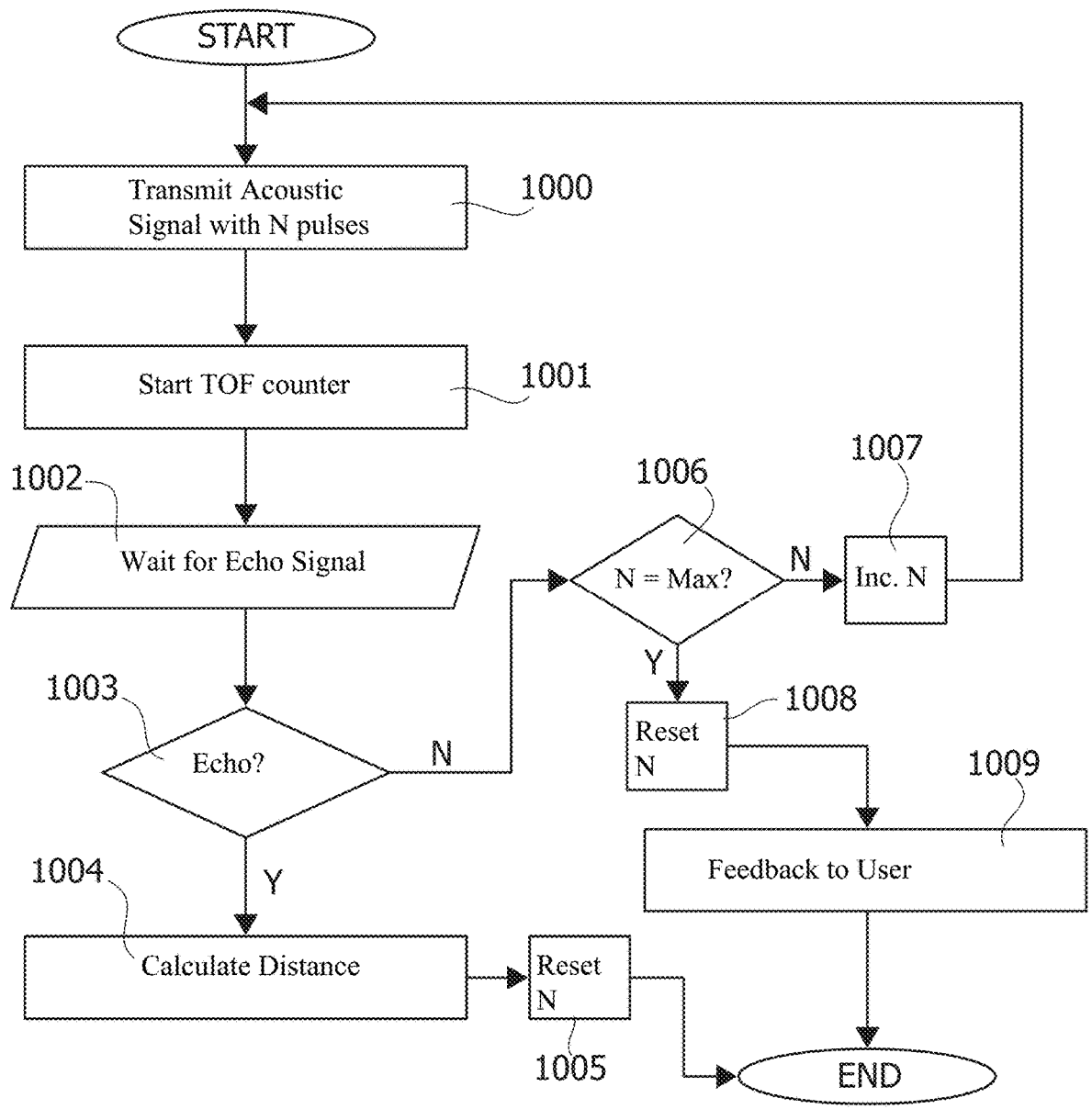
FIG. 3 is a flow chart exemplary of possible operation of one or more embodiments.

The flow chart of FIG. 3 is exemplary of possible operation of a system 100 as discussed previously.

After beginning (START) operation in a step 1000 a transmitter transducer may be driven with a plurality of N pulses at a selected frequency (e.g., natural resonant frequency of the piezo crystal. In one or more embodiments the number N of pulses may be first set to a (e.g., user selectable) starting value Min, e.g., N=Min.

In a step 1001 a TOF (time of flight) counter may be started (e.g., after resetting).

In a step 1002 an echo signal may be waited for (e.g., until a certain time out).

Step 1003 is exemplary of a validating step where a check is made as to whether a valid echo was received.

If the outcome of step 1003 is positive, the distance D may be calculated in a step 1004 and (possibly after resetting the number N of pulses to the starting value Min in a step 1005) operation may come to an END, e.g., in view of starting a new detection event.

If the outcome of step 1003 is negative, the number N of pulses in the transmission signal may be increased in order to produce a transmission signal with a higher energy.

This may involve a first step 1006 where a check is made as to whether the number of pulses (possibly increased with respect to the starting value Min) has reached an upper limit Max N (possibly user selectable).

If the outcome of step 1006 is negative (that is the upper limit is not reached yet), in a step 1007 the number of pulses in the transmission signal TS is increased (e.g., of an increase step, e.g., increased by one) and operation returns "upstream" of the step 1000, that is with a new transmission signal TS having an increased energy due to the increased number of pulses therein.

Operation as discussed herein may involve one or more negative outcomes of the step 1003, with transmission repeated correspondingly with energy levels of the signal TS increased step-wise (e.g., with the number N of pulses increased via unitary increases, e.g., N=Min+1, N=Min+2, N=Min+3 and so on) until step 1003 yields a positive outcome, that is a "valid" echo signal is received permitting the distance D to be calculated.

If, despite repeated transmissions with gradually increased number N of pulses, no valid echo signal is received and the upper limit of step 1006 (e.g., Max N) is reached (positive outcome of step 1006) the number N of pulses may be reset to the starting value (e.g., N=Min) in a step 1008 while in a step 1009 feedback may be provided, e.g., indicating to the user that the distance could not be calculated, while the system may be configured to start a new detection attempt.

Figure 4:
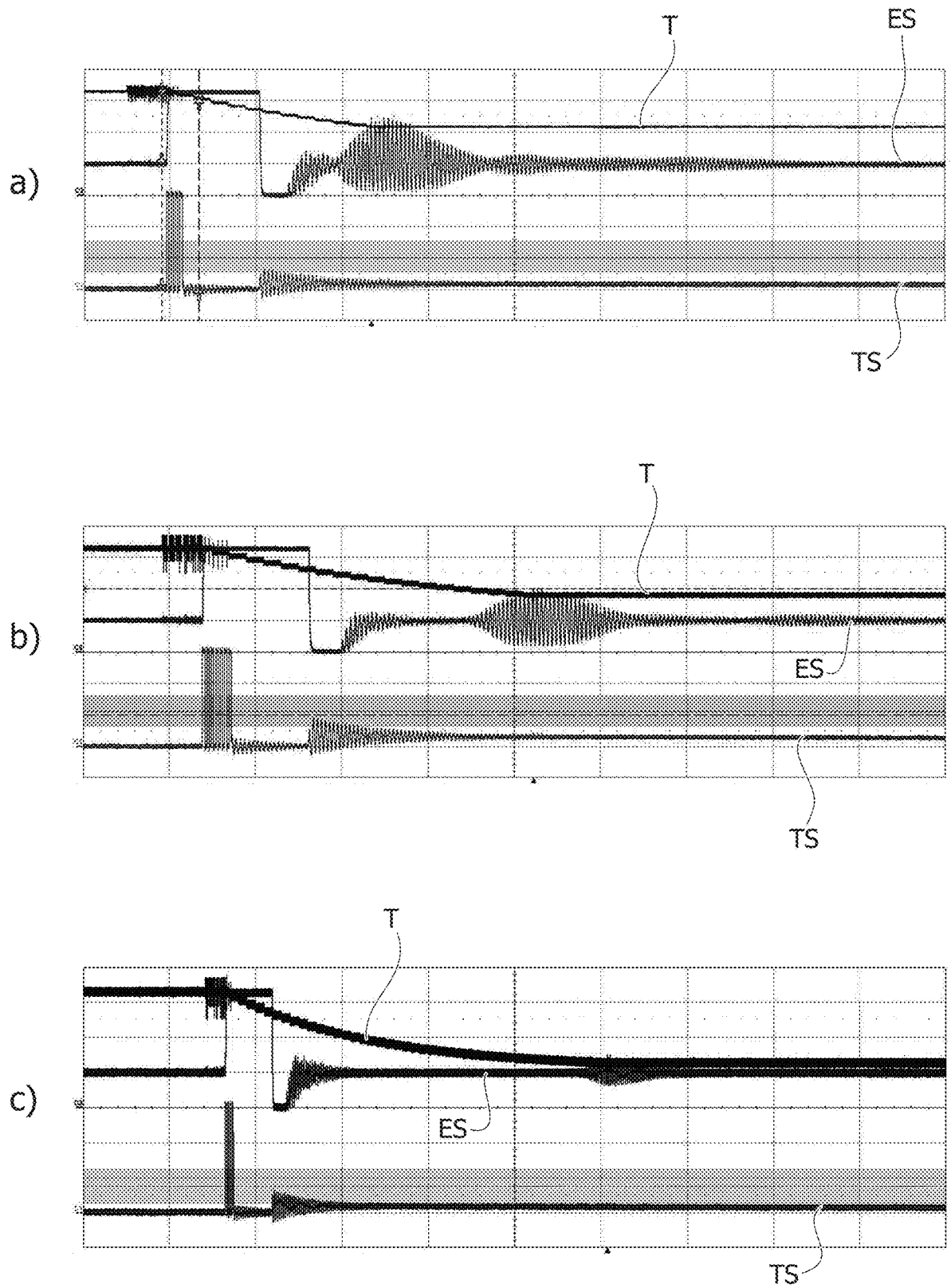
FIG. 4, including three portions, designated a), b) and c), respectively, is exemplary of a possible time behavior of signals in one or more embodiments.

The three diagrams of FIG. 4 are exemplary of possible time behaviors of:

a transmission signal TS corresponding to the transmission wave TW, a received signal ES corresponding to a received echo wave EW, a validation threshold T (which, in one or more embodiments may be made time dependent, e.g., decreasing over time in order to allow for the decrease of the strength of those echo signals that are received with a longer TOF, that is from a larger distance, this exhibiting a higher attenuation.

The three diagrams of FIG. 4 also show that, in one or more embodiments, the receiver RX may be disabled during transmission in order to avoid false positive echoes due, e.g., to transmitter signal "leaking" into the receiver.

The three cases of FIG. 4 are exemplary of a transmitted signal TS resulting in a "valid" echo signal ES, that is an echo signal ES strong enough to reach the threshold T is shown, with possible previous transmissions leading to failure (negative outcome of step 1003 in FIG. 3) and adjustment (e.g., increase) of the number of pulses (step 1007 in FIG. 3) not illustrated.

For instance (it is stressed that the diagrams of FIG. 4 are merely exemplary and shall not be construed in a limiting sense of the embodiments):

diagram a) in FIG. 4 is exemplary of a possible behavior with a wood target material at a distance D=15 cm, with a transmission signal TS including four pulses;

diagram b) in FIG. 4 is exemplary of a possible behavior with a wood target material at a distance D=25 cm, with a transmission signal TS including seven pulses, that is a higher number of pulses in comparison to diagram a) due to the longer distance to the target;

diagram c) in FIG. 4 is exemplary of a possible behavior with a target material including a wall surface at a distance D=70 cm, with a transmission signal TS including four pulses, that is a number of pulses equal to diagram a) and lower than diagram b) irrespective of the longer distance to the target due to the higher reflectivity of the wall target material in comparison with wood.

One or more embodiments may thus provide a method of detecting objects, the method including:

transmitting acoustic signals (e.g., TW) including sets of pulses towards an object (e.g., O) to induce echo signals (e.g., EW) resulting from reflection of the acoustic signals at the object, wherein the time delay of the echo signals is indicative of the distance (e.g., D) to the object, the method including:

transmitting (e.g., 1000) a first acoustic signal including a first set of pulses including a first number of pulses, checking (e.g., 1003) if a first echo signal resulting from reflection of said first acoustic signal is received with an intensity reaching an echo detection threshold (e.g., T), and i) if the intensity of said first echo signal reaches said echo detection threshold, calculating (e.g., 1004) the distance to the object as a function of the time delay of said first echo signal, ii) if the intensity of said first echo signal fails to reach said echo detection threshold, transmitting at least one further acoustic signal including a set of pulses wherein the number of pulses is increased (e.g., N=Min+1, N=Min+2, N=Min+3, . . . ; 1007) with respect to the number of pulses in said first acoustic signal.

One or more embodiments may include:

checking (e.g., 1003) if at least one further echo signal resulting from reflection of said at least one further acoustic signal is received with an intensity reaching a respective echo detection threshold, and
  i) if the intensity of said at least one further echo signal reaches said echo detection threshold, calculating the distance to the object as a function of the time delay of said at least one further echo signal,
  ii) if the intensity of said at least one further echo signal fails to reach said respective echo detection threshold, transmitting at least one still further acoustic signal including a set of pulses wherein the number of pulses in the at least one still further acoustic signal is still further increased over the number of pulses in said at least one further acoustic signal.

In one or more embodiments the number of pulses in said at least one further acoustic signal may be increased (1007) stepwise (e.g., N=Min+1, N=Min+2, N=Min+3, . . . ); over the number of pulses in said first acoustic signal.

In one or more embodiments, the number of pulses in said at least one further acoustic signal may be increased by unitary steps over the number of pulses in said first acoustic signal.

One or more embodiments may include discontinuing transmitting said acoustic signals as a result of checking (e.g., 1006) that the number of pulses in said at least one further acoustic signal has reached an upper threshold value with the intensity of the corresponding echo signal failing to reach a respective echo detection threshold. In one or more embodiments, said acoustic signals may include ultrasound signals.

One or more embodiments may include gradually decreasing said echo detection threshold (see, e.g., FIG. 4) as a function of the time delay of said echo signals.

In one or more embodiments, an object detector may include:

a transmitter (e.g., 103, TX) for transmitting acoustic signals including sets of pulses towards an object to receive echo signals resulting from reflection of the acoustic signal at the object, wherein the time delay of the echo signal is indicative of the distance to the object,
  a receiver (e.g., 103, RX) for receiving said echo signals, the receiver configured for operating accordingly to the method of one or more embodiments.

Without prejudice to the underlying principles, the details and embodiments may vary, even significantly, with respect to what has been described in the foregoing by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
  detecting a distance to an object, the detecting including:
    transmitting an initial acoustic signal including an initial number of pulses;
    obtaining a valid echo signal by repeatedly performing a set of acts in response to not receiving an initial echo signal that satisfies a threshold for detecting the valid echo signal, each act including:
      transmitting a subsequent acoustic signal having an increased number of pulses relative to a previous number of pulses of a previous act; and
      determining whether the valid echo signal that satisfies the threshold is received in response to the transmitting of the subsequent acoustic signal;
    discontinuing the performing of the set of acts in response to the increased number of pulses exceeding a pulse limit;
    initiating a next act in the set of acts in response to the increased number of pulses not exceeding the pulse limit; and
    calculating the distance to the object in response to obtaining the valid echo signal, the calculating including determining a time delay between the transmitting of the subsequent acoustic signal and the valid echo signal.

2. The method of claim 1, wherein obtaining the valid echo signal includes:
  transmitting a second acoustic signal having a second number of pulses greater than the initial number of pulses;
  receiving a second echo signal resulting from reflection of said second acoustic signal;
  determining that an intensity of the second echo signal does not satisfy the threshold; and
  transmitting a third acoustic signal having a third number of pulses greater than the second number of pulses in response to determining that the intensity does not satisfy the threshold and in response to determining that the second number of pulses does not exceed the pulse limit.

3. The method of claim 2, wherein a first difference between the initial number of pulses and the second number of pulses matches a second difference between the second number of pulses and the third number of pulses.

4. The method of claim 1, wherein the threshold includes a condition indicating that an intensity value of the valid echo signal exceeds a threshold intensity value, each of the acts including:
  determining whether a subsequent echo signal is received that has an intensity satisfying the condition; and
  initiating performance of the next act as a result of determining that the subsequent echo signal having an intensity satisfying the condition was not received and that the increased number of pulses does not exceed the pulse limit.

5. The method of claim 1, wherein the threshold includes a condition indicating that the valid echo signal is received within a defined time period subsequent to transmission of the subsequent acoustic signal, each of the acts including:
  determining whether a subsequent echo signal is received within the defined time period; and
  initiating performance of the next act as a result of determining that the subsequent echo signal was not received within the defined time period and that the increased number of pulses does not exceed the pulse limit.

6. The method of claim 1, an individual act of the set of acts including:

determining whether a subsequent echo signal is received in response to transmission of the subsequent acoustic signal;
as a result of determining that the subsequent echo signal was received and that the subsequent echo signal does not satisfy the threshold, determining an echo time delay between transmitting the subsequent acoustic signal and receiving the subsequent acoustic signal; and
decreasing an echo detection threshold associated with the threshold based on the echo time delay, wherein the echo detection threshold is implemented in a subsequent act of the set of acts.

7. An object detector, comprising:
a transceiver; and
a controller coupled to the transceiver, the controller configured to:
cause the transceiver to transmit an initial acoustic signal including an initial number of pulses; and
repeatedly perform a set of acts to obtain a valid echo signal in response to not receiving an initial echo signal that satisfies a threshold for detection of the valid echo signal, and for each act, the controller configured to:
transmit a subsequent acoustic signal having an increased number of pulses relative to a previous number of pulses of a previous act; and
determine whether the valid echo signal that satisfies the threshold is received in response to the transmission of the subsequent acoustic signal;
discontinue the performance in response to the increased number of pulses exceeding a pulse limit;
initiate a next act in the set of acts in response to a determination that the increased number of pulses does not exceed the pulse limit; and
calculate the distance to the object in response to receipt of the valid echo signal by determining a time delay between transmission of the subsequent acoustic signal and receipt of the valid echo signal.

8. The object detector of claim 7, wherein the controller, in iterative performance of the set of acts, is configured to:
transmit a second acoustic signal having a second number of pulses greater than the initial number of pulses;
determine that an intensity of a second echo signal does not satisfy the threshold; and
causes the transceiver to transmit a third acoustic signal having a third number of pulses that is greater than the second number of pulses in response to determination that the intensity of the second echo signal does not satisfy the threshold and in response to determination that the second number of pulses does not exceed the pulse limit.

9. The object detector of claim 7, wherein the transceiver includes a transmitter and a receiver, separate from the transmitter.

10. The object detector of claim 9, wherein the receiver, in operation, receives an initial echo signal and subsequent acoustic echo signal, produced by the object reflecting the initial acoustic signal and subsequent acoustic signal, and converts the initial acoustic echo signal and the subsequent acoustic echo signal into the initial echo signal and subsequent echo signal.

11. The object detector of claim 7, wherein the controller, in iterative performance of the set of acts, is configured to:
determine whether a subsequent echo signal is received that has an intensity satisfying the condition; and
initiate performance of the next act as a result of a determination that the subsequent echo signal with an intensity satisfying the condition was not received and that the increased number of pulses does not exceed the pulse limit.

12. The object detector of claim 7, wherein the controller, in iterative performance of the set of acts, is configured to:
determine whether a subsequent echo signal is received in response to transmission of the subsequent acoustic signal;
as a result of a determination that the subsequent echo signal was received and that the subsequent echo signal does not satisfy the threshold, determine an echo time delay between transmission of the subsequent acoustic signal and receipt of the subsequent acoustic signal; and
decrease an echo detection threshold associated with the threshold based on the echo time delay, wherein the echo detection threshold is implemented in a subsequent act of the set of acts.

13. A method, comprising:
detecting a distance to an object, the detecting including:
transmitting an initial acoustic signal including selecting an initial number of pulses;
obtaining a valid echo signal by repeatedly performing a set of acts in response to not receiving an initial echo signal that satisfies a threshold for detecting the valid echo signal, each act including:
transmitting a subsequent acoustic signal having an increased number of pulses relative to a previous number of pulses of a previous act; and
decreasing the threshold in response to determining that a subsequent echo signal received in response to the transmitting of the subsequent acoustic signal does not satisfy the threshold;
discontinuing the iterative performing of the set of acts in response to the increased number of pulses exceeding a pulse limit;
initiating the next act in the set of acts in response to determining that the increased number of pulses does not exceed the pulse limit; and
calculating the distance to the object in response to obtaining the valid echo signal.

14. The method of claim 13, wherein calculating the distance includes:
calculating a time of flight between transmitting the subsequent acoustic signal and receiving the subsequent echo signal resulting from reflection of the subsequent acoustic signal by the object.

15. The method of claim 13, wherein obtaining the valid echo signal includes:
transmitting a second acoustic signal having a second number of pulses greater than the initial number of pulses;
receiving a second echo signal resulting from reflection of said second acoustic signal;
determining that an intensity of the second echo signal does not satisfy the threshold; and
transmitting, in response to determining that the intensity does not satisfy the threshold, a third acoustic signal having a third number of pulses that is greater than the initial number of pulses and less than the second number of pulses of the second acoustic signal, in response to the intensity of the first echo signal -being below the echo detection threshold.

16. The method of claim 15, wherein a first difference between the initial number of pulses and the second number of pulses matches a second difference between the second number of pulses and the third number of pulses.

17. The method of claim 13, wherein the threshold includes a condition indicating that an intensity value of the valid echo signal exceeds a threshold intensity value, each of the acts including:
- determining whether a subsequent echo signal is received that has an intensity satisfying the condition; and
- initiating performance of the next act as a result of determining that the subsequent echo signal having an intensity satisfying the condition was not received and that the increased number of pulses does not exceed the pulse limit.

18. The method of claim 13, wherein the threshold includes a condition indicating that the valid echo signal is received within a defined time period subsequent to transmission of the subsequent acoustic signal, each of the acts including:
- determining whether a subsequent echo signal is received within the defined time period; and
- initiating performance of a next act as a result of determining that the subsequent echo signal was not received within the defined time period and that the increased number of pulses does not exceed the pulse limit.

* * * * *